United States Patent [19]
Sato

[11] 3,787,625
[45] Jan. 22, 1974

[54] AUTOMATIC TELEPHONE ANSWERING APPARATUS WITH CONFIRMATION OF ANSWER GAP LENGTH FOR MIDCYCLE SWITCHING

[75] Inventor: Takashi Sato, Kawasaki, Japan

[73] Assignee: Pioneer Electronic Corporation, Tokyo, Japan

[22] Filed: July 14, 1971

[21] Appl. No.: 162,599

[30] Foreign Application Priority Data
July 18, 1970 Japan....................45/63023 [U]

[52] U.S. Cl...................... 179/6 R, 179/100.1 VC
[51] Int. Cl...................... H04m 1/64, G11b 27/22
[58] Field of Search .................. 179/6 R, 6 AC, 179/6 C, 6 E, 100.1 VC, 1VC

[56] References Cited
UNITED STATES PATENTS

| | | | |
|---|---|---|---|
| 3,433,897 | 3/1969 | Munson | 179/6 R |
| 3,445,600 | 5/1969 | Todd | 179/6 R |
| 3,226,478 | 12/1965 | Martin et al. | 179/6 R |

FOREIGN PATENTS OR APPLICATIONS

| | | | |
|---|---|---|---|
| 914,696 | 1/1963 | Great Britain | 179/6 R |
| 901,173 | 7/1962 | Great Britain | 179/6 R |
| 1,280,949 | 10/1968 | Germany | 179/6 R |

*Primary Examiner*—Raymond F. Cardillo, Jr
*Attorney, Agent, or Firm*—Sughrue, Rothwell, Mion, Zinn and Macpeak

[57] ABSTRACT

Disclosed herein is an automatic telephone answering apparatus which sends out an outgoing message to a calling party in a minimum time period and automatically switches to a recording state to record an incoming message from the calling party in response to the end of the outgoing message even though the tape which carries the outgoing message has not completed an entire revolution.

3 Claims, 2 Drawing Figures

PATENTED JAN 22 1974 3,787,625

SHEET 2 OF 2

AUTOMATIC TELEPHONE ANSWERING APPARATUS WITH CONFIRMATION OF ANSWER GAP LENGTH FOR MIDCYCLE SWITCHING

BACKGROUND OF THE INVENTION

1. Field of the Invention

This invention relates to an automatic telephone answering apparatus, and more particularly to an automatic telephone answering apparatus which sends out an outgoing message to a calling party in the minimum time necessary and switches immediately to a recording state to record an incoming message from the calling party.

2. Description of the Prior Art

A prior art automatic telephone answering apparatus is illustrated in FIG. 1 and operates as follows.

When a ringing current reaches terminals 11 through a telephone line, the ringing current is applied to a rectifying circuit 12 through condensers C1 and C2. The rectified ringing current is smoothed by a condenser C3 and gradually charges a condenser C4 through a variable resistor VR1 and a diode D1. When the ringing current appears at terminals 11 for longer than an appointed time (about 3 to 10 seconds), the condenser C4 is sufficiently charged to a base biasing voltage to turn off a transistor $Tr1$. When the transistor $Tr1$ turns OFF, a transistor $Tr2$ turns ON and a relay Y1 operates to switch its respective contacts.

Under the hysteresis characteristic of a Schmitt trigger circuit, as the condenser C4 discharges to a predetermined voltage, transistor $Tr1$ continues to be held in the OFF state. Therefore, the relay Y1 operates continuously until the transistor switches to the ON state again. The operating time period of the relay Y1 corresponds to an answering and recording operation time period of the automatic telephone answering apparatus.

The respective contacts $y11$, $y12$ and $y13$ are switched by energizing relay Y1. By switching contact $y11$, the telephone line is connected to a matching transformer 13, and a communication circuit is formed. By switching of the contact $y12$, a motor M1 is connected to a power source 14, and rotates. When the motor M1 rotates, a tape transport mechanism not shown in FIG. 1 operates, and an answering tape T1 in an answering portion 15 is caused to move. The outgoing message which is previously recorded on the answering tape T1 is reproduced by means of a magnetic head 151, amplified by an amplifier 152, and sent to the calling party through the matching transformer 13, the contact $y11$ and the terminal 11. The answering tape T1 is an endless tape. As it makes one complete revolution, the conductive foil 153 bonded to the answering tape T1 causes short circuit of electrodes 16. In addition, by switching contacts $y11$, the ringing current is no longer applied to the rectifying circuit 12. Therefore, diode D1 is turned to the OFF state by a direct current source voltage and the condenser C4 is discharged through a resistor R2.

When the electrodes 16 are short circuited, a relay Y2 operates through contact $y13$ to switch its contacts. The contacts $y21$, $y22$ and $y23$ of the relay Y2 switch to the opposite sides shown by FIG. 1. Upon actuation of the contacts $y21$, the relay Y2 is held by itself and is thus continuously held in the operating state. By switching of the contact $y22$, the secondary winding of the matching transformer 13 is connected to an amplifier 172 in a recording portion 17. By switching contact $y23$, the power source 14 is connected to the motor M2 instead of the motor M1. Therefore, the motor M1 stops rotating and the motor M2 starts to rotate. In addition, even though the motor M1 is cut off, the answering tape T1 is transported for a few additional seconds by the rotating inertia of a flywheel which is included in the tape transport mechanism for driving the answering tape T1. Therefore, the conductive foil 153 passes by the electrodes 16 and does not stop at the position where it would short circuit the electrodes 16. The recording tape T2 for recording an incoming message is transported by the rotation of the motor M2. The message signal from the calling party passes through the connection terminal 11, the contact $y11$, the matching transformer 13 and the contact $y22$, and is amplified in the amplifier 172. It is then recorded on the recording tape T2 by means of the magnetic head 171.

The condenser C4 is discharged gradually through resistor R2. When it is discharged to a predetermined voltage after a certain time has passed, namely, when the base voltage of the transistor $Tr1$ becomes higher than the predetermined voltage, the transistor $Tr1$ turns ON, and the transistor $Tr2$ turns OFF. Therefore, the relay Y1 is de-energized to thereby switch the contacts $y11$, $y12$ and $y13$ toward th positions shown by FIG. 1, and the relay Y2 is de-energized also. At the same time, the recording operation terminates and the communication circuit of the telephone network breaks. At this point, the automatic telephone answering apparatus is restored to a stand-by state to receive the next new call.

Thus, in the prior art automatic telephone answering apparatus, the operating time period to send an outgoing message to the calling party is not determined by the length of the outgoing message itself, but by the time it takes for the answering tape T1 to make one complete revolution or by a preselected timer period of a timer circuit. Therefore, such prior art devices are inconvenient when the time required for one telephone call is limited to a predetermined time or when it is desired to shorten the time of a long distance telephone call. In other words, even if the outgoing message is sent within 10 seconds, if it takes 20 seconds for the answering tape T1 to make one revolution, the calling party can not record his message during the 10 seconds which is the difference between the 20 seconds and the 10 seconds. Thus, a subscriber of the apparatus is usually required to record the outgoing message, which can be sent out within 10 seconds, over 20 seconds.

SUMMARY OF THE INVENTION

The present invention alleviates the above noted disadvantages of the prior art.

It is one object of the invention to provide an automatic telephone answering apparatus which switches immediately, in response to the length of an outgoing message, to a recording state to record an incoming message from a calling party after the outgoing message has been sent.

It is another object of the invention to provide an automatic telephone answering apparatus with which the subscriber can check whether the outgoing message is recorded without a pause longer than a specified time period and the outgoing message may be sent in the shortest time necessary.

Other objects, advantages and features of the present invention will become apparent from the following description taken in conjunction with the accompanying drawings.

DESCRIPTION OF THE PREFERRED EMBODIMENT

Figure 2:
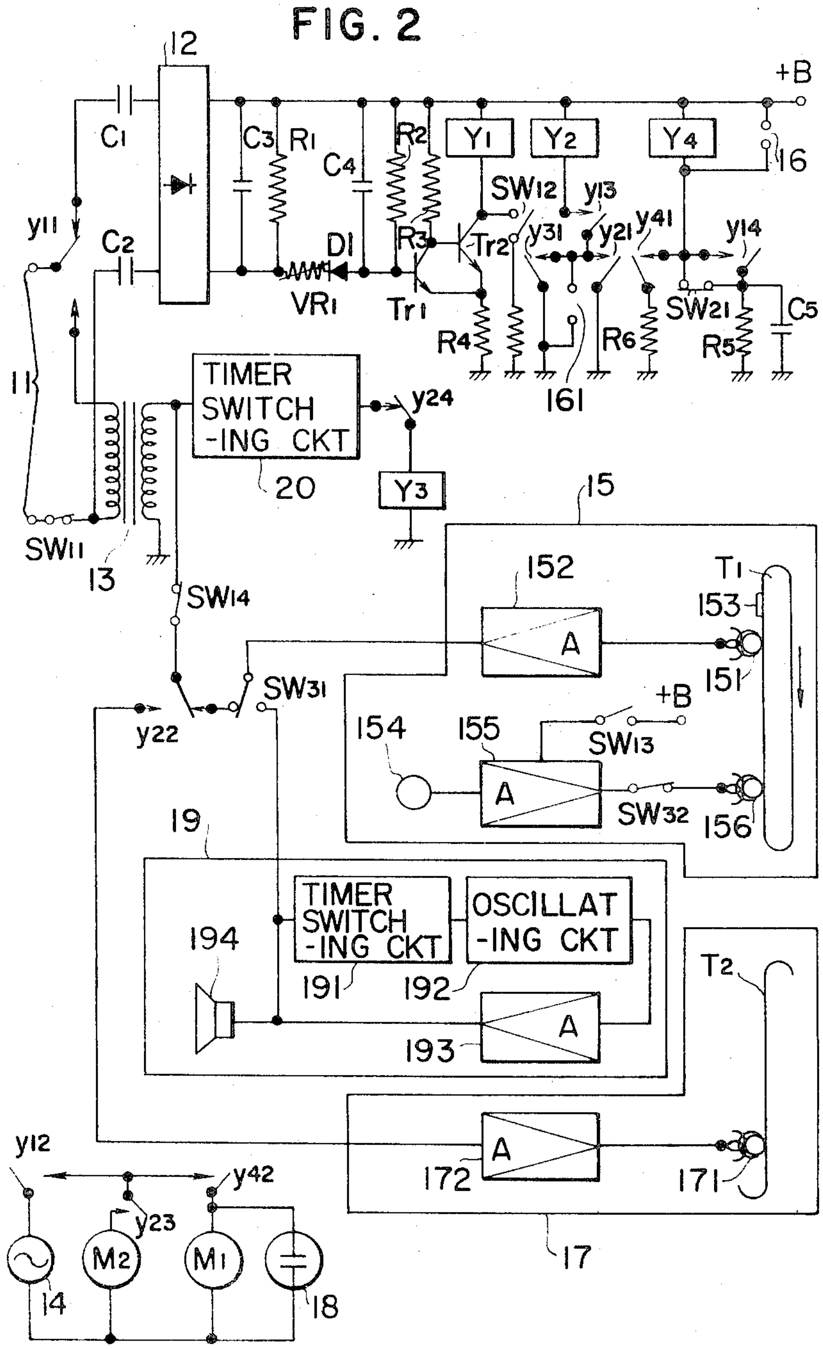
FIG. 2 is a circuit diagram showing one embodiment of an automatic telephone answering apparatus in accordance with the present invention.

Recording of an outgoing message in accordance with the teachings of this invention will now be explained. When cooperating switches SW11, SW12, SW13 and SW14 are switched respectively from the positions shown in FIG. 2, a telephone line is opened by the opening of the switch SW11, and a relay Y1 is energized by the closing of the switch SW12. A power source is connected to an amplifier 155 in an answering portion 15 by the closing of the switch SW13. By opening of the switch SW14, an output circuit of amplifier 152 is blocked from a timer switching circuit 20 described below. In this state, when a push-button type switch SW21 is closed, a condenser C5, previously discharged through a resistor R5 of relatively high resistance, is charged up through a relay Y4, and the relay Y4 is energized. Subsequently, the relay Y4 is continuously held in the energized state by its contact y41. By the switching of the contact *y*42 of the relay Y4, a motor M1 rotates and an answering tape T1 begins to run. During the rotating of the motor M1, a lighted neon lamp 18 indicates that the answering tape T1 is running. An outgoing message signal from a microphone 154 is amplified by the amplifier 155 and is recorded on the answering tape T1 by means of a magnetic head 156. After the outgoing message has been recorded and a conducting foil 153 short-circuits electrodes 16, the relay Y4 is de-energized, and the motor M1 stops rotating. As a result, the answering tape T1 stops running. The stopping of the answering tape T1 is indicated by the neon lamp 18 turning off. Even though contact *y*14 may be closed, the relay Y4 remains deenergized because the required large starting current needed to operate the de-energized relay Y4, does not flow through the resistor R5.

Next is explained the case of listening and checking the prerecorded answering message. In this case, the states of the switches SW11 . . . SW14 are switched toward the opposite sides shown in FIG. 2. When cooperating switches SW31 and SW32 are switched from the positions shown in FIG. 2, the amplifier 152 is connected to a recording state confirming circuit 19 by way of the switch SW31 while the switch SW32 cuts off a signal circuit from the recording magnetic head 156. When the push-button type switch SW21 is pressed, the relay Y4 is energized and continuously held in the energizing state by its contact *y*41. The motor M1 starts to rotate, and the answering tape T1 starts to run. The precorded outgoing message signal is picked up by means of the magnetic head 151, amplified in the amplifier 152, and is emitted from a monitor-speaker 194 via the switch SW31. The reproduced signal is also applied to a timer switching circuit 191 at the same time. The timer switching circuit 191 is a circuit to operate an oscillating circuit 192 when an input signal ceases for more than a specified time period (for example, 3 seconds). When the prerecorded outgoing message ceases for more than the preselected time period, namely, when the precorded answering tape T1 has nonrecorded tape portions longer than the preselected length on it, the timer switching circuit 191 triggers the oscillating circuit 192. The oscillator signal is amplified by the amplifier 193 and emitted from the loudspeaker 194. Therefore, it is known that the outgoing message is not continuously and efficiently recorded on it. The answering tape T1 makes one revolution and stops as mentioned above. If an oscillating sound was emitted from the loudspeaker 194, the recording of the outgoing message should be done over again. With the check operation just described, the outgoing message is recorded on the answering tape T1 with a minimum nonrecorded portion.

Figure 1:
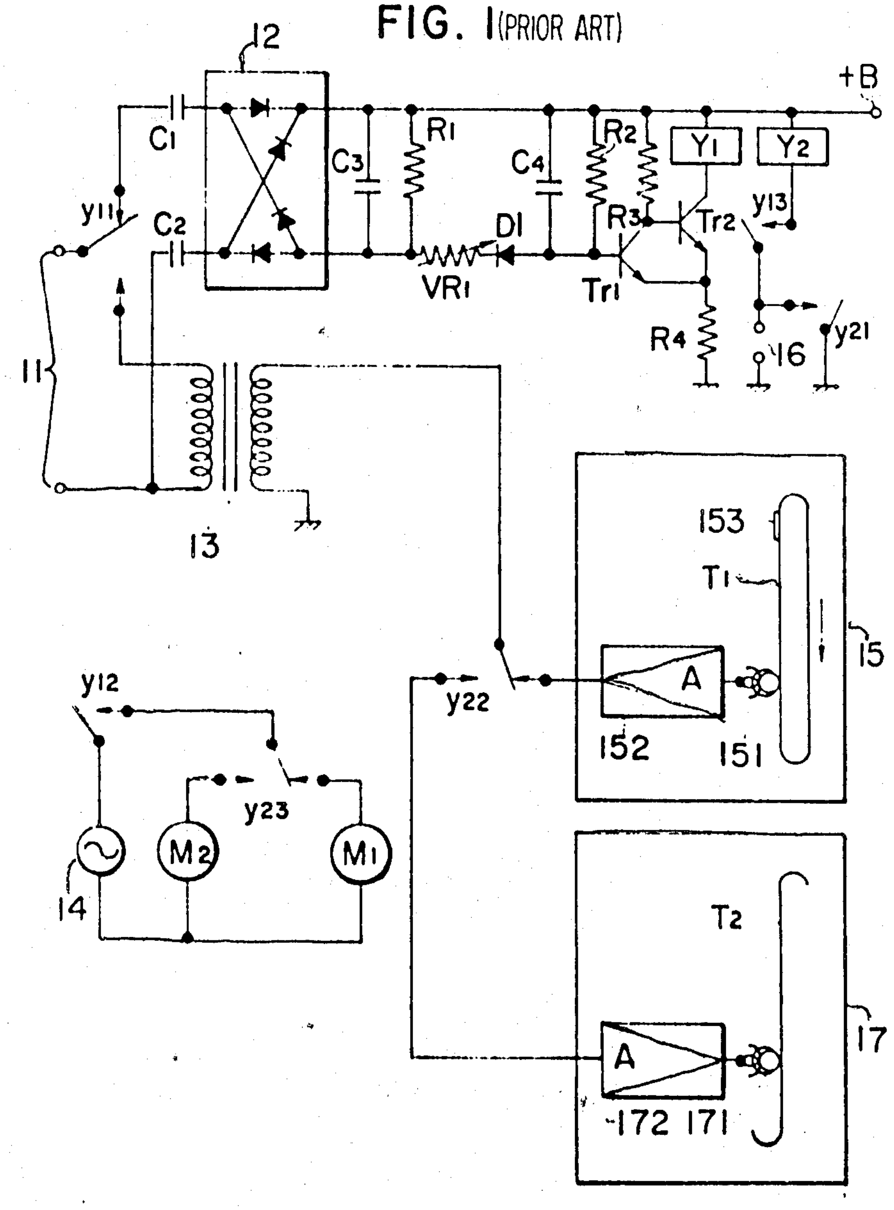
FIG. 1 (PRIOR ART)
FIG. 1 is a circuit diagram of the prior art automatic telephone answering apparatus.

There will now be explained the answering operation of the apparatus in response to a calling signal from a calling party. All the switches return to the positions shown in FIG. 2. The operation of the circuits is the same as described with reference to FIG. 1 from the receiving of the ringing current until the operation of relay Y1. The relay Y1 operates and thus the relay Y4 is energized via the contact y14 and held in the energized state by its own contact *y*41. The motor M1 is connected to the power source 14 through the contact *y*42 and starts to rotate. The answering tape T1 runs and the outgoing message is reproduced by means of the magnetic head 151, amplified by the amplifier 152, and sent out to the calling party by way of the switch SW31, the contact *y*22, the switch SW14, the matching transformer 13 and the connection terminal 11. A part of the output signal of the amplifier 152 is applied also to a timer switching circuit 20. The timer switching circuit 20 operates a relay Y3 when an input signal ceases for more than a specified time period (for example, 3 seconds). When the outgoing message has been reproduced and transmitted, although the answering tape T1 has not yet made one complete revolution, the timer switching circuit 20 operates to energize the relay Y3 after the lapse of the specified time period. Thus, the relay Y2 is energized by way of the contacts *y*13 and *y*31 and held in the energizing state by its own contact *y*21. The incoming message from the calling party is applied to the amplifier 172 in the recording portion 17 via the contact y22. A motor M2 starts to rotate by the closing of the contact y23, and a recording tape T2 starts to run. The incoming message is amplified by the amplifier 172 and then recorded on the recording tape T2 by means of the magnetic head 171. When the condenser C4 is discharged to the predetermined voltage, all the functions of the automatic telephone answering apparatus is restored to a stand-by state to receive a next new call through the same circuit operation as mentioned with respect to FIG. 1.

In addition, even after the recording of the incoming message has started, the answering tape T1 continues to run regardless of the recording operation of the incoming message. The conductive foil 153 on the answering tape T1 short-circuits the electrodes 16 and thus the relay Y4 is de-energized, and the motor M1 stops rotating by the opening of contacts *y*42. Therefore, the outgoing message may be reproduced from its beginning during the next answering operation, since the answering tape T1 starts at its beginning at this time.

When the outgoing message fills the recording tape T1, the conductive foil 153 short-circuits electrodes 16 before the specified time period (3 seconds in this embodiment) has elapsed. In this case, even though the answering tape T1 stops running, the recording tape T2 does not start simultaneously, but starts after a few seconds. To eliminate this disadvantage, the secondary electrodes 161 are arranged in front of and in parallel with electrodes 16. The electrodes 161 are short-circuited just before the electrodes 16 are short-circuited, and thus the recording operation starts by the switching of the relay Y2.

The automatic telephone answering apparatus according to the present invention, as set forth above, has many advantages.

The automatic telephone answering apparatus sends out an outgoing message to a calling party in the shortest time necessary, and switches immediately to a recording state to record an incoming message from the calling party after the outgoing message has been completed. Therefore, it is able to shorten the time for each telephone call.

Further, when the time for a telephone call (the whole answering operation time of the automatic telephone answering apparatus) is specified to be a certain time period, one is able to extend the recording time period for recording the incoming message in the specified time period.

While the invention has been particularly shown and described with reference to the preferred embodiment thereof, it will be understood by those skilled in the art that various changes in form and details may be made therein without departing from the spirit and scope of the invention.

What is claimed is:

1. An automatic telephone answering apparatus of the type including an endless answer tape, which includes means for indicating the completion of one complete revolution of said answer tape, means responsive to said complete revolution indicating means for stopping said answer tape after one complete revolution, means for recording an outgoing message on said answer tape, means for playing back said outgoing message and means for recording an incoming message from the calling party, the improvement comprising:

first means adapted to receive said outgoing message and responsive to the termination of said outgoing message for a predetermined period of time, for activating said means for recording an incoming message, whereby an incoming message is recorded and said answer message tape continues to move to its start position, recording state confirming means manually connectable to said answer tape playing back means, or providing an indication in response to the occurrence of a gap in the outgoing message signal lasting for approximately said predetermined period.

2. An automatic telephone answering apparatus, as claimed in claim 1 wherein said means for indicating the completion of one complete revolution of said answer tape comprises a first conductor foil, said answer tape further including detecting means responsive to said first conductor foil reaching a position indicating substantial completion of one complete revolution for activating said incoming message recording means in the absence of prior activation caused by said first means.

3. In an automatic telephone answering apparatus of the type in which an incoming call activates an endless answer tape to cause an outgoing message to be reproduced by an answer tape reproducing means and sent to a caller, and a message tape is activated sometime after the sending of said outgoing message to record an incoming message from the caller, and wherein said apparatus is further of the type including means for stopping said answer tape after a complete revolution thereof the improvement comprising, a. means connected to said answer tape reproducing means and adapted to receive said outgoing message simultaneously with the sending of said outgoing message to said caller, for activating said incoming message tape when said outgoing message has terminated for a predetermined duration,
b. said means for stopping said answer tape after a complete revolution thereof comprises a conductive foil at a start-stop point on said endless tape and a first sensing means positioned to respond to the foil when the tape completes a revolution for deactivating said endless answer tape,
c. second sensing means, positioned to respond to said foil when said answer tape has substantially completed a revolution, for activating said incoming message tape if said incoming message tape has not previously been activated,
d. manually operable switch means for disconnecting said automatic telephone answering apparatus to make it non-responsive to incoming calls, and
e. recording state confirming means operable only when said automatic telephone answering apparatus is disconnected for detecting gaps in the said outgoing message recorded on said answer tape said gaps being at least as long as said predetermined duration, said recording state confirming means comprising,
   i. timer switching means connected to said answer tape reproducing means for producing a trigger signal in response to said gaps in said outgoing message,
   ii. oscillating means responsive to said trigger signal for generating an oscillating signal, and
   iii. speaker means responsive to said oscillating signal for emitting an audible tone.

* * * * *